UNITED STATES PATENT OFFICE.

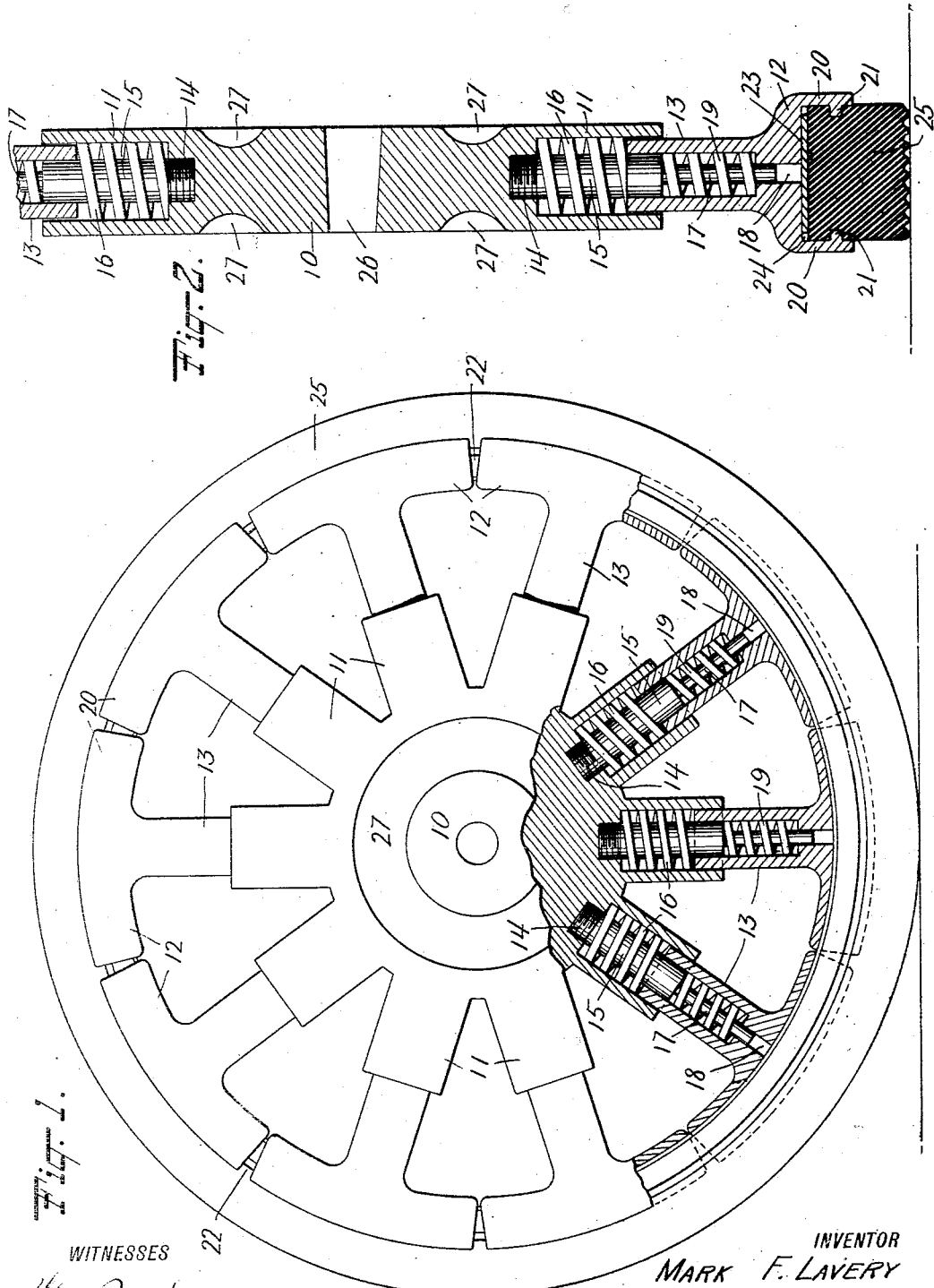

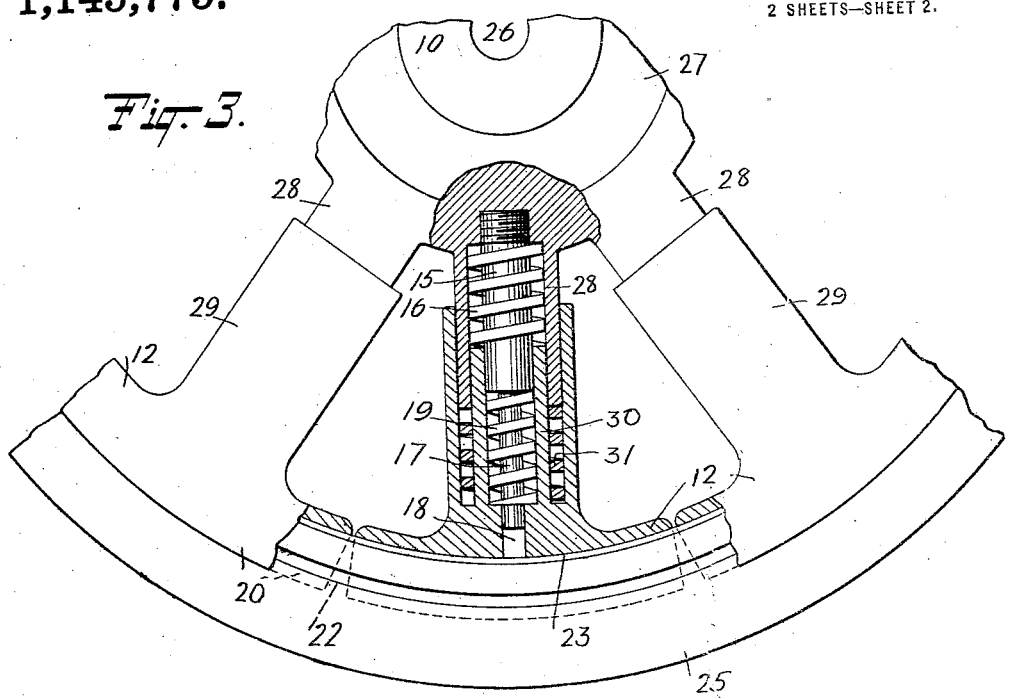

MARK FRANCIS LAVERY, OF NEW YORK, N. Y.

SPRING TELESCOPIC-SPOKE WHEEL.

1,145,775.          Specification of Letters Patent.       Patented July 6, 1915.

Application filed August 27, 1913. Serial No. 786,930.

*To all whom it may concern:*

Be it known that I, MARK F. LAVERY, a citizen of the United States, and a resident of the city of New York, borough of Brooklyn, in the county of Kings and State of New York, have invented a new and Improved Spring Telescopic-Spoke Wheel, of which the following is a full, clear, and exact description.

This invention has special reference to novel and useful improvements in vehicle wheels and more especially to those designed for use in connection with automobiles, motor trucks and the like.

An object of the invention resides in the provision of an improved spring telescopic-spoke wheel in which the rim is made up of a series of sections formed with or carried by the movable part of a spoke, each spoke embodying telescoping sections with interposed spring or cushioning means for taking up shock and vibration, while means are provided to encircle the rim sections to equally distribute the compression upon the resilient or spring means around the wheel as the latter rotates under a load.

A further object of the invention is the provision of an automobile wheel having telescopic-spoke sections with interposed studs and resilient means designed to form a cushion for the wheel, while a metallic band and a solid rubber tire encircle the rim and are capable of disposition or engagement around the latter while the resilient means are normally compressed, such construction providing a maximum amount of resiliency capable of being produced by a pneumatic tire but further obviating punctures and like troubles.

With the above and other objects in view, the invention resides more particularly in the peculiar combination and arrangement of parts which will be illustrated as a preferred embodiment in the accompanying drawings and described in the specification.

Reference is to be had to the accompanying drawings forming a part of this specification, in which similar characters of reference indicate corresponding parts in all the views, and in which—

Figure 1 is a side elevation of a spring wheel constructed in accordance with one embodiment of the invention, a portion of the wheel being shown in section to disclose the construction of the telescopic spokes and the mounting of the cushioning means therein; Fig. 2 is a central vertical sectional view of the improved wheel, the parts being enlarged with relation to Fig. 1 and the top part of the wheel being broken away; Fig. 3 is a side elevation of a fragmentary portion of a wheel with a modified form of spoke and spring structure, a portion of the wheel being shown in section to disclose the latter.

As illustrated in the drawings, the numeral 10 designates the hub of the wheel which, as shown in Figs. 1 and 2, is preferably made in a single casting and provided with a plurality of suitably spaced and radially extending sleeves 11 forming parts of the spokes of the wheel. The rim comprises a plurality of segmental sections 12, intermediate the ends of each of which an inwardly extended sleeve 13 is provided, preferably as an integral part. Each of the sleeves 13 is designed to slidably engage in the bore of each corresponding sleeve 11, the interior portions of which are tapped to provide frictionless bearing faces and to permit the sleeves to snugly fit one within the other to avoid lateral motion.

Connected to the hub 10 in centered relation to the sleeves 11, as by means of threaded bores 14, are circular studs 15 around which coiled springs 16, preferably of rectangular cross section, are mounted, said springs bearing against the end walls of the bores of the sleeves 11 and the inner ends of the sleeves 13, so as to normally resist inward movement of the latter and rim sections under a load. The outer ends of the circular or cylindrical studs 15 slidably fit within the sleeves 13 and have reduced extensions 17 extending into the bores of the sleeves 13 and into reduced bores 18 between the end walls of the bores of the sleeves 13 and the outer walls of the rim sections 12, while coiled springs 19 are mounted on the reduced portions 17 between said end walls and the studs 15 to resist further compression. The coils of the springs 19 are also preferably of rectangular cross section so that they properly fit in the space provided, and by bearing directly and smoothly against the interior walls of the bores of the sleeves and with the parts movable therein, serve to form guide means for said movable parts.

The rim sections 12 are of channel formation, as shown in Fig. 2 of the drawings, and are provided with the side flanges 20 having inwardly extending ribs 21 continuously of their lengths, while the ends of the rim sections are spaced apart, as shown at 22, in convergent relation to allow compression and expansion of the springs or cushioning elements as the sections move inwardly and outwardly with relation to the hub, it being understood that sufficient space is allowed between the extremities of the rim sections as to allow the sections to move freely and independently. A continuous metallic band, preferably of spring steel, is fitted around the sections of the rim while the latter are held normally inward against the action of the springs so that the latter are compressed, such band or binder 23 covering the passages or bores 18 and being capable of placement diagonally with respect to the rim. For this purpose the band or binder is made of such width as to be slightly spaced from the inner walls of the flanges 20, as shown at 24 in Fig. 2 of the drawings. A solid rubber tire 25 is fitted around the rim sections forming the rim of the wheel and bears against the band or binder 23 so as to coöperate with the latter to resist outward movement of the studs which, by means of their reduced portions 13, operate through the bores or passages 18 and are capable of contacting with and exerting outward pressure against the band or binder. The tire is forced in position beyond the ribs 21 which seat in grooves in the sides of the tire, so that the tire is securely held in position and coöperates with the band to evenly distribute the compression around the wheel and to the springs of the various telescopic spokes as the wheel rotates under a load. The hub, as shown, is provided with the usual bore 26 for the axle and is hollowed out, as shown at 27, to lighten the structure, which latter, including the telescopic sleeves forming the spokes, are exaggerated in bulk and thickness to more clearly illustrate the structure, for in practice the sleeves will be relatively thin.

In Fig. 3 of the drawings a modified spoke structure is shown, while the hub and rim sections remain the same. In this form the hub 10 is provided with radially extending sleeves 28 which fit within sleeve sections 29 extending inwardly from the rim sections, being a reverse arrangement of that illustrated in Figs. 1 and 2 of the drawings. The rim sections, apart from the sleeves 29, are further provided with inwardly spaced and extending sleeves 30 which terminate short of the inner ends of the sleeves 29 and coöperate with the latter sleeves to provide interior channels in which coiled springs 31 are disposed and designed for engagement by the outer ends of the sleeves 28 for the usual compression and expansion actions. The studs are of the usual construction so that it will be apparent that this form of the invention is practically the same as that shown in Fig. 1, except that the additional sleeve sections 29 and the additional springs 31 are provided to receive the sleeves formed with or carried by the hub. Thus it will be seen that as the wheel rotates under a load the hub will be forced downwardly with respect to the center of the wheel and compress the upper and lower springs beyond those which are horizontal or substantially horizontally disposed, which compression will be gradually decreased toward the sides of the wheel horizontally from the axle, and by reason of the continuous band or binder and the tire which normally hold the springs or cushion elements compressed, the wheel will assume the shape of an ellipse horizontally, while the springs or cushion elements horizontally or substantially horizontally of the axis of the wheel will expand thus obviating shocks and vibrations.

Having thus described my invention, what I claim as new and desire to secure by Letters Patent is:—

1. The combination with a wheel including a hub and a rim having oppositely extending tubular spoke sections telescoping one within the other and studs removably carried by the hub within the spoke sections thereof and snugly operating in the other spoke sections, said rim sections having openings therethrough and the studs having reduced portions loosely operating in the last named sections and snugly operating in the openings; of springs encircling the studs at the enlarged and reduced portions thereof to operate between the ends of certain of the sections and the end walls of the bores of the sections telescoping therewith, a continuous resilient metallic binder encircling the rim sections and a tire carried by the rim exteriorly of the binder.

2. A spring telescopic-spoke wheel comprising a hub having radial sleeves, a rim comprising a plurality of independent grooved sections having inwardly extending sleeves slidably engaging the first named sleeves, spring means mounted between the hub and rim sections and inclosed by certain of said sleeves to act between the end walls of the bores thereof and the ends of the other sleeves, studs threaded in the hub and projecting outwardly therefrom and snugly fitting the bores of the sleeves carried by the respective sections of the rim, said studs having reduced portions and the sections having openings snugly receiving said reduced portions therethrough, a metallic band engaged around the rim sections of the rim to hold them in fixed relation to the axis of the wheel but to permit distribution of compression and expansion as the wheel rotates under a load, said band being engaged by the extremities of the last named reduced portions and resisting the tendency of outward movement thereof as the sleeves telescope incident to shocks and the like and a solid cushion bearing held upon the rim within the grooved sections thereof.

3. A spring wheel embodying a hub having radial sleeves, segmental rim sections having centrally disposed inwardly extending sleeves telescopically fitting the first-named sleeves, studs reduced at their outer ends removably carried by the hub within said first named sleeves and operating through the second named sleeves, said rim sections being bored to receive the reduced portions of the respective studs therethrough, springs mounted between the ends of certain of the sleeves and bottoms of the bores of the other sleeves and a tire encircling the rim sections.

4. A spring wheel embodying a hub having radial sleeves, segmental rim sections having centrally disposed inwardly extending sleeves telescopically and snugly fitting the first named sleeves, studs carried by the hub within said first named sleeves and operating through the second named sleeves, springs mounted between the ends of certain of the sleeves and end walls of the bores of the sleeves coöperating therewith, said rim sections having openings therethrough receiving the studs, a resilient binder held upon the rim formed by said rim sections, each section having side flanges, and tire retaining means carried by said sections.

5. A spring wheel embodying a hub having radial sleeves spaced apart, segmental rim sections having centrally disposed inwardly extending concentric sleeves receiving the sleeves of the hub therebetween, said sections terminating with their ends in spaced relation converging inwardly to permit independent movement thereof, studs fixed to the hub at the bottoms of the bores of the sleeves of said hub and slidably mounted in the respective rim section sleeves, expansible springs between the hub and rim sections, certain of said springs being interposed between the sleeves of the rim sections and the bottoms of the bores of the respective hub sleeves, said rim sections having apertures through which the studs are movable, and a continuous resilient tire encircling the rim sections.

In testimony whereof I have signed my name to this specification in the presence of two subscribing witnesses.

MARK FRANCIS LAVERY.

Witnesses:
JOHN S. BURCH,
GEORGE H. EMSLIE.

Copies of this patent may be obtained for five cents each, by addressing the "Commissioner of Patents, Washington, D. C."